(12) United States Patent
Schoenfelder

(10) Patent No.: US 12,528,560 B2
(45) Date of Patent: Jan. 20, 2026

(54) BRACING OR STIFFENING ELEMENT FOR SNOWMOBILE SUSPENSION RAIL

(71) Applicant: Ray Schoenfelder, Zumbrota, MN (US)

(72) Inventor: Ray Schoenfelder, Zumbrota, MN (US)

(73) Assignee: Ray Schoenfelder, Zumbrota, MN (US)

( * ) Notice: Subject to any disclaimer, the term of this patent is extended or adjusted under 35 U.S.C. 154(b) by 502 days.

(21) Appl. No.: 18/085,239

(22) Filed: Dec. 20, 2022

(65) Prior Publication Data

US 2024/0199171 A1    Jun. 20, 2024

(51) Int. Cl.
*B62M 27/02*    (2006.01)

(52) U.S. Cl.
CPC ....... *B62M 27/02* (2013.01); *B62M 2027/026* (2013.01)

(58) Field of Classification Search
CPC . B62M 27/02; B62M 2027/026; B62D 55/10; B61F 3/00
See application file for complete search history.

(56) References Cited

U.S. PATENT DOCUMENTS

| | | |
|---|---|---|
| 9,321,509 B2 | 4/2016 | Beavis |
| 9,771,130 B2 | 9/2017 | Beavis |
| 11,214,334 B2 | 1/2022 | Beavis |
| 2011/0278083 A1* | 11/2011 | Yoshihara ............. B62M 27/02 180/182 |
| 2015/0166143 A1 | 6/2015 | Beavis |
| 2016/0251058 A1 | 9/2016 | Beavis |
| 2017/0349239 A1 | 12/2017 | Beavis |
| 2020/0094918 A1* | 3/2020 | Beavis ................. B62M 27/02 |
| 2022/0111930 A1 | 4/2022 | Beavis |

OTHER PUBLICATIONS

Pancheri, D. "2019 Arctic Cat M8000 Mountain Cat Alphaone—First Ride!" SnowTech Magazine (2018) <https://www.snowtechmagazine.com/2019-arctic-cat-m8000-mountain-cat-alpha-one/>, accessed Sep. 13, 2022.

* cited by examiner

*Primary Examiner* — Karen Beck
(74) *Attorney, Agent, or Firm* — Westman, Champlin & Koehler, P.A.; Z. Peter Sawicki; Amanda M. Prose

(57) ABSTRACT

A device and method for internal bracing and stiffening of a suspension rail for a snowmobile with a housing for installation within a cavity of the suspension rail and having an upper surface, lower surface, and opposing side surfaces extending along a length of the housing. At least one of the upper surface and opposing side surfaces are configured to directly contact an inner surface of the suspension rail when the housing is installed within the interior of the suspension rail. The length of the housing is equal to or less than a length of the interior of the suspension rail. The housing has dimensions sufficient to allow the housing to fit within the interior of the suspension rail without lateral or vertical movement therein. The housing is secured within the interior of the suspension rail without hardware for fastening or coupling the housing to the interior of the suspension rail.

13 Claims, 5 Drawing Sheets

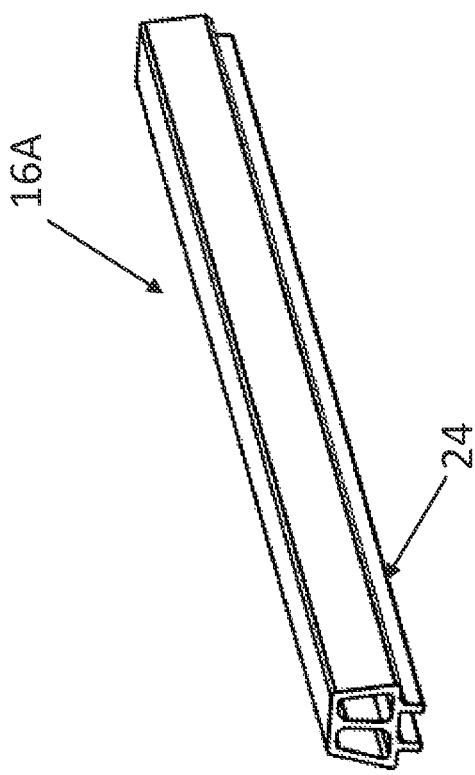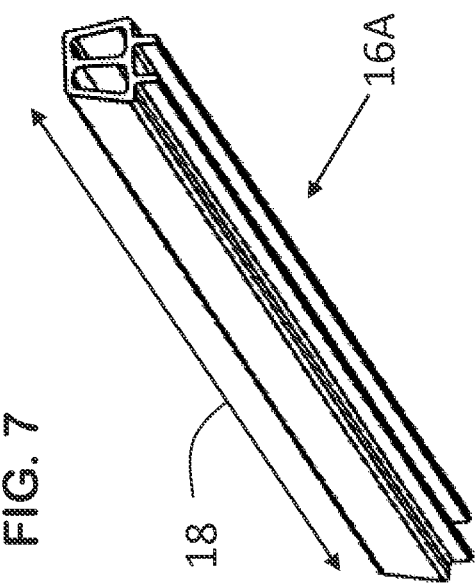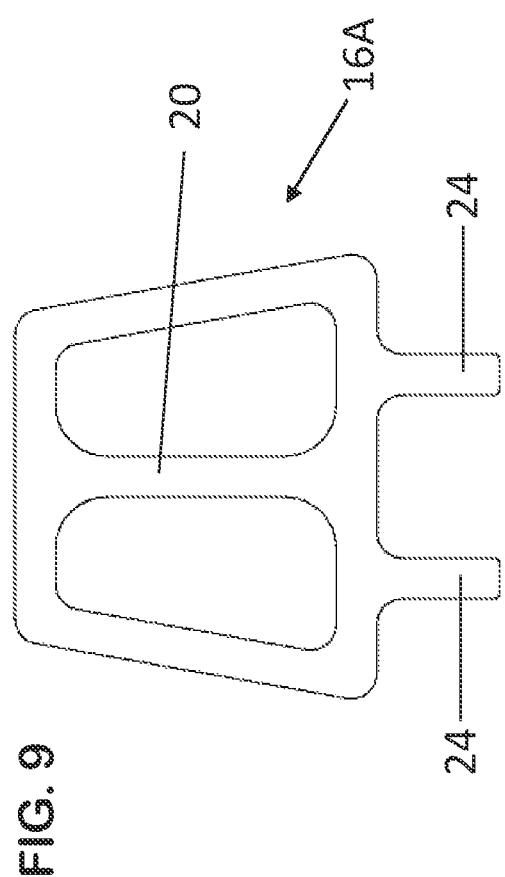

BRACING OR STIFFENING ELEMENT FOR SNOWMOBILE SUSPENSION RAIL

BACKGROUND

The present invention relates to a brace for a suspension rail on a snowmobile, and more specifically to an internal brace for a snowmobile having only one suspension rail.

A snowmobile suspension system includes a suspension rail that extends a length where the endless track of the snowmobile rotates therearound. The mid-section of the suspension rail is susceptible to damage as snowmobiles traverse trails where rough conditions may be visibly concealed by snow and ice.

Kits for reinforcing the suspension rail include right and left braces which are externally mounted to locations on the suspension rail with mounting hardware. The external pair of braces, mounting on opposing sides of the suspension rail together provide strength and durability in extreme terrain and aid in the bend resistance for the suspension rail.

The braces are provided in a pair which adds weight to the snowmobile. Moreover, the external coupling of the braces requires rivets or other fastener system such as bolts for mounting. The external braces are coupled to the rail via a plurality of individual rivets spaced along the length of the suspension rail and brace.

SUMMARY

An aspect of the present disclosure relates to a bracing system for a suspension rail of a snowmobile, the bracing system comprising a tubular housing having a length and a cross-sectional profile providing exterior surface dimensions along the length of the tubular housing that allow the tubular length to be inserted into a cavity in the suspension rail in a manner such that when the bracing system is enclosed in the cavity of the suspension rail, the bracing system is substantially stationary with respect to vertical and lateral movement.

In one or more embodiments, a second tubular housing having a length and a cross-section profile providing exterior surface dimensions along the length of the tubular housing that allow the tubular length to be inserted into a cavity in the suspension rail in a manner such that when the bracing system is enclosed in the cavity of the suspension rail, the bracing system is substantially stationary with respect to vertical and lateral movement and wherein the tubular housing is a first tubular housing positioned above the second tubular housing within the cavity of the suspension rail of the snowmobile.

The first tubular housing and the second tubular housing have different cross-section profiles.

The first tubular housing and the second tubular housing are not in direct contact with one another within the cavity and each of the first tubular housing and the second tubular housing are supported by or in direct contact with one or more interior surfaces of the cavity of the suspension rail.

In one or more embodiments, the tubular housing comprises an internal wall extending between two opposing wall surfaces of the tubular housing.

The tubular housing comprises an external surface extending outwardly from the perimeter of the tubular housing for providing a support surface for the tubular housing within the cavity of the suspension rail, wherein the external surface extending from the perimeter of the tubular housing contacts an inner surface of the suspension rail.

The tubular housing braces the suspension rail along substantially the entire length of the suspension rail as the tubular housing is in contact with one or more interior surfaces of the suspension rail along substantially the entire length of the suspension rail.

The tubular housing is a tubular extrusion comprising aluminum and comprising a trapezoidal extrusion profile.

The tubular housing is comprised of aluminum, titanium, fiberglass, carbon fiber or combinations thereof.

Another aspect of the present disclosure relates to an internal bracing and stiffening element for a suspension rail for a snow mobile with a housing configured for installation within a cavity of the suspension rail and comprising an upper surface, lower surface, and opposing side surfaces extending along a length of the housing wherein at least one of the upper surface and opposing side surfaces are configured to directly contact an inner surface of the suspension rail when the housing is installed within the interior of the suspension rail, wherein the length of the housing is equal to or less than a length of the interior of the suspension rail, wherein the housing has dimensions sufficient to allow the housing to fit within the interior of the suspension rail without lateral or vertical movement therein, and wherein the housing is secured within the interior of the suspension rail without hardware for fastening or coupling the housing to the interior of the suspension rail.

Each of the upper surface and opposing side surfaces has dimensions configured to abut an interior surface of the suspension rail.

Yet another aspect of the present disclosure relates to a method for bracing a suspension rail of a snowmobile by inserting one or more internal bracing elements into an interior cavity of the suspension rail of the snowmobile and concealing the one or more internal bracing elements therein and wherein the one or more internal bracing elements have dimensions sufficient to fit within the interior cavity in a manner wherein vertical and lateral movement within the interior cavity is prevented.

Securing the one or more internal bracing elements within the interior cavity includes directly contacting one or more surfaces of one or more internal bracing elements directly with one or more interior surfaces of the cavity for holding the one or more internal bracing elements in an installation position.

BRIEF DESCRIPTION OF THE DRAWINGS

FIG. 7 is a bottom perspective view of an internal brace for the suspension rail of the snowmobile.

FIG. 8 is a side perspective view of the internal brace for the suspension rail of the snowmobile illustrated in FIG. 7.

FIG. 9 is a front view of the internal brace for the suspension rail of the snowmobile illustrated in FIG. 7.

DETAILED DESCRIPTION

Figure 1:
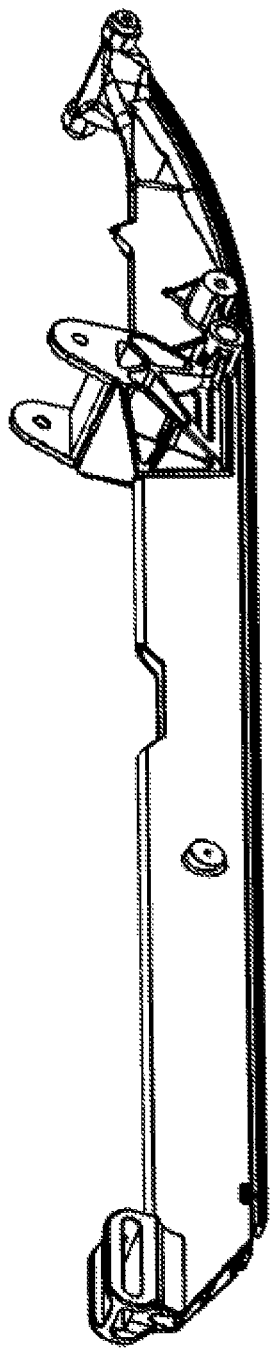
FIG. 1 is side view of a pre-existing suspension rail for a snowmobile.

A snowmobile is most generally described as a vehicle having a drive assembly utilizing a track and a steering assembly utilizing skis. The track is an endless track and in many snowmobile models, that track encircles a skid frame. The skid frame maintains a portion of the endless track in contact with the ground and provides a suspension for enhancing ride quality of the snowmobile. The skid frame generally comprises a skid or suspension rail which has a length that extends longitudinally between a rear and front idler wheel(s) and the track slides therearound. In various snowmobiles, the track is supported by a suspension with a single suspension rail and the track has a width that is wider than a width of the suspension rail.

The suspension rail is a generally hollow construction that coextends with the length of the track for the snowmobile and may have a box beam construction or have an internal cavity of a substantially constant cross-section, the cross-section being any geometric shape. The suspension rail generally resides low to the ground and is separated from the ground by the track. One type of suspension for a snowmobile is described generally in U.S. Pat. No. 11,214,334.

Described herein is an internal bracing and/or stiffening mechanism for a suspension rail of a snowmobile. The internal bracing mechanism is positionable to fit within an open cavity of the suspension rail of a pre-existing snowmobile and may be especially advantageous in so called "monorail" systems where the snowmobile comprises a single suspension rail and corresponding suspension supporting an endless track for propelling the snowmobile. The bracing and/or stiffening mechanism according to one or more embodiment described herein has a length that spans at least a portion of the length of the suspension rail cavity and may extend substantially along the length of the open cavity of the suspension rail.

The use of an internal bracing and/or stiffening mechanism that can be installed during manufacture of a suspension rail, or as an after-market part for any suspension rail of a snowmobile produced by various manufactures provides numerous benefits. The mechanism described herein can be mounted within the suspension rail without additional hardware such as rivets, screws or other fasteners. Outer dimensions of the bracing or stiffening mechanism are configured to allow the mechanism to be inserted within the open cavity of the suspension rail and held in place therein, thus providing additional support to the suspension rail without external equipment that may require powder coating to match the snow mobile, and without additional surface area which creates drag and collects snow and debris during use.

One or more internal bracing and/or stiffening mechanisms according to one or more embodiments described herein may be provided for insertion within a suspension rail housing. For example, there may be an upper and lower internal bracing mechanism installed within the suspension rail and contained therein. The upper and lower internal bracing mechanisms may have the same dimensions or different dimensions to account for variation in the cross sectional shape of the cavity along the length of the suspension rail.

The internal bracing and/or stiffening mechanism described herein may be provided as a metal extrusion constructed from aluminum, titanium or like materials providing strength and rigidity. The mechanism may also be a fiber glass component or otherwise comprised of materials having high strength, rigidity, and that remain lightweight. This allows the internal bracing and/or stiffening mechanism to weigh approximately one-half as much as external mounted rail braces, while achieving the same load deflection.

The internal bracing and/or stiffening mechanism has a length and a cross-sectional dimension that may have an overall rectangular, square, triangular or other geometric shape. The cross-sectional shape may be truncated and/or may comprise multiple shapes. The cross section may be consistent along the length of the bracing and/or stiffening mechanism. The internal bracing and/or stiffening mechanism may also have one or more substantially open cavities along its length, and/or may have one or more structures in the cavity to provide additional strength to the mechanism itself. The bracing and/or stiffening mechanism may also have one or more structures or surfaces extending from an outer surface along the length of the bracing and/or stiffening mechanism where these structures or surfaces contact an inner surface of the suspension rail in order to support the bracing and/or stiffening mechanism inside the suspension rail cavity.

The bracing and/or stiffening mechanism may be provided with dimensions as disclosed herein such that the profile of the mechanism may allow the mechanism to be slid or otherwise pushed with manual force into a corresponding space within the interior of the suspension rail and retained in place via a friction fit into the corresponding space. The bracing and/or stiffening mechanism when inserted into the interior of the suspension rail may be enclosed within the suspension rail and is preferably entirely enclosed therein. Thus, vertical and lateral (side to side) movement of the installed mechanism with respect to the interior surfaces of the suspension rail is substantially or completely eliminated as the direct contact between one or more surfaces of the mechanism and surfaces of the interior space prevent such movement. Undesired longitudinal movement is also substantially prevented by way of the length of the mechanism coextending substantially with a length of the correspondence space and/or by way of friction between the contacted surfaces of the mechanism and the interior of the suspension rail. Additionally, the exterior dimensions of the bracing and/or stiffening mechanism may correspond closely with the interior dimensions of the suspension rail such that contact between one or more surfaces on the each of the bracing and/or stiffening mechanism and one or more interior surfaces of the suspension rail prevents movement without outside manual or mechanical force applied to one or both of the bracing and/or stiffening mechanism and the suspension rail.

The bracing and/or stiffening mechanism may brace the entire suspension rail along its length. The bracing and/or stiffening mechanism may contact the inner surface of the suspension rail along the entire length of the suspension rail, thus providing continuous bracing to the entire or substantially entire suspension rail length. This is in contrast to the prior braces which only brace the rail at the individual rivets which connect the external brace to the suspension rail.

The bracing and/or stiffening mechanism is generally tubular in construction with a cross-sectional dimension or profile that may provide a symmetric or asymmetric profile. The mechanism may have one or more wall sections which divide the interior into one or more parallel cavities that extend along a length of the bracing and/or stiffening mechanism, and may have one or more external walls or protrusions which may provide surface area or supports for installation and secure positioning in the interior of the suspension rail. A thickness of the walls of the tubular construction may be in the range of about 1/16 inch to about 1/2 inch, or for example within the range of about 1/8 inch to about 1/4 inch. In one embodiment the wall thickness may be approximately 0.080 inches In installation, the bracing and/or stiffening mechanism can be provided along a length of the suspension prone to bending or denting from use of the snowmobile. For example, the mechanism can be inserted and positioned at a length of the otherwise generally hollow suspension rail and more specifically at the mid-section of the suspension rail, reinforcing the rail without externally mounted components and without hardware for securing to and through the rail.

The internal bracing and/or stiffening mechanism described herein can eliminate the need for external supports for the single suspension rail of the snowmobile as the bracing system is contained entirely within the body of the suspension rail itself. The mechanism abuts one or more internal surfaces of the suspension rail to provide impact and break resistance as well as strength across and along the length of the suspension rail. In one or more embodiments, the mechanism abuts the internal surface continuously along the length of the suspension rail and the mechanism is in contact with one or more internal surfaces of the suspension rail along the length of the suspension rail.

The bracing and/or stiffening mechanism described herein is lighter than external braces for suspension rails and eliminates the need for mounting hardware. As the bracing and/or stiffening mechanisms described here are inserted into the cavity of the original suspension rail and have a structure and dimensions configured to fit within the cavity and be in contact with one or more internal surfaces of the suspension rail along a portion or the entire suspension rail, the mechanisms described herein eliminate the use of spaced apart rivets, screws or other hardware for securing the bracing mechanism to the suspension rail. That is, the bracing and/or stiffening mechanisms according to one or more embodiments do not require hardware for retaining the bracing or stiffening mechanism in place within the cavity of the suspension rail. This results in a bracing and/or stiffening mechanism that costs approximately 1/3 the costs of an external suspension rail brace costs with installation. The configuration also eliminates visible external hardware and thus eliminates the need for a powder coat to match OEM colors of the suspension rail.

The bracing and/or stiffening mechanism may be provided with various profiles or cross-sectional dimensions allowing the mechanism to be installed within the suspension rail of various snowmobile models and brands. The length of the mechanism may also vary, but in various embodiments the length co-extends with a length of the midsection of the suspension rail or extends substantially the length of the suspension rail.

In further detail as illustrated in FIGS. 3-6, a bracing system 10 for an internal cavity 12 of a suspension rail 14 comprises one or more internal bracings, also referred to as housings 16 which are configured for insertion into the cavity 12. The one or more housings 16 may be tubular in construction and have a length 18 that coextends at least partially along a length of the suspension rail 14.

In the embodiment illustrated in the figures and shown in further detail at FIGS. 7-12, a system 10 for bracing utilizes two housings 16 each having a length 18 that extends along at least a portion of the length of the suspension rail 14. A first housing may be an upper housing 16A is tubular in construction with a substantially hollow construction. The upper housing 16A has a trapezoidal cross-sectional dimension with a substantially centered vertical wall 20 which connects to a floor 22 of the housing 16A. The housing 16A may also have one or more external protrusions 24 extending outwardly from a side the floor 22 opposite the wall 20. The one or more external protrusions 24 then also extend along the length 18 of the housing 16A. The housing 16A has external dimensions that allow at least one or more of the outer perimeter surfaces to mate with one or more inner surfaces of the suspension rail 14. In the embodiment illustrated, the protrusion 24 extends downwardly to contact a surface of the interior cavity of the suspension rail and to ensure a dimensional fit of the housing 16A into a corresponding portion of the cavity of the suspension rail 14.

A second housing may be a lower housing 16B, which is also a tubular construction with a cavity extending along the length thereof. The housing 16B has an overall "T" shape with at least one vertical wall 26 therein, which in the embodiment illustrated separates two parallel inner cavities of the housing 16B. The second housing 16B may have an upper section 28 of the housing 16B having first dimensions which allow the upper section 28 to contact one or more inner surfaces of the suspension rail 14. The housing 16B then may have a lower section 30 of different dimensions and those dimensions configured to vertically support the 16B in the suspension rail 14.

The dimensions of the one or more housings 16 which are configured for installation within the cavity 12 of the suspension rail 14 are sufficient to allow the one or more housings 16 to be slide or otherwise be inserted into the cavity 12 of the suspension rail and such that outer perimeter dimensions of the one or more housings 16 allow for insertion into the cavity 12 while concurrently preventing vertical and lateral movement of the one or more housings when inserted into the cavity 12.

Figure 2:
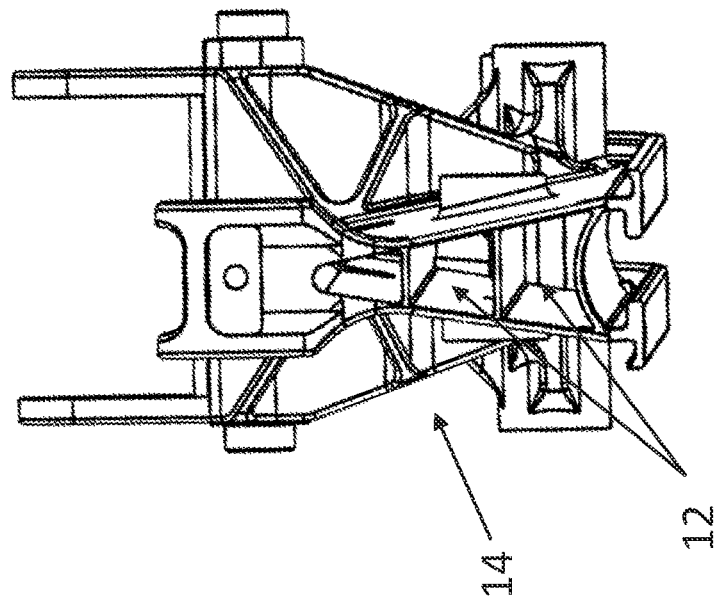
FIG. 2 is a front view of pre-existing suspension rail illustrating the interior of the suspension rail.
Figure 4:
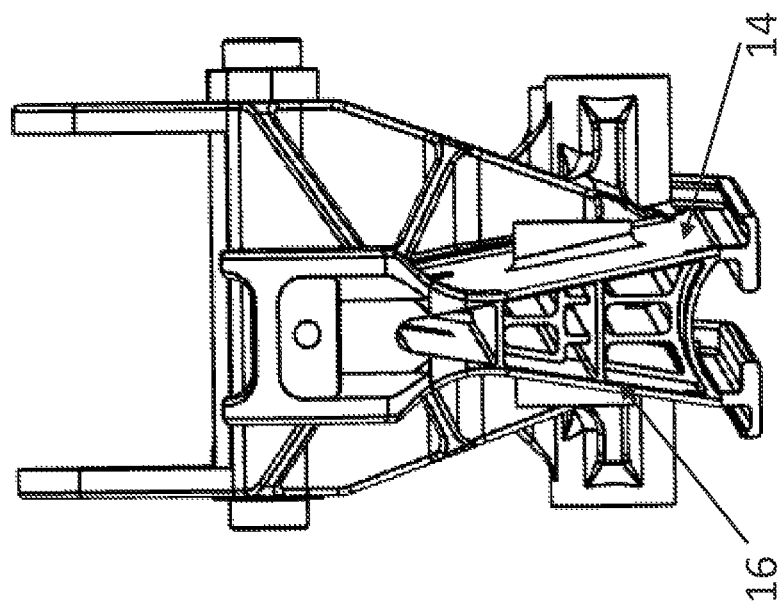
FIG. 4 is front perspective view of the internal bracing system installed in the suspension rail of a snowmobile.
Figure 3:
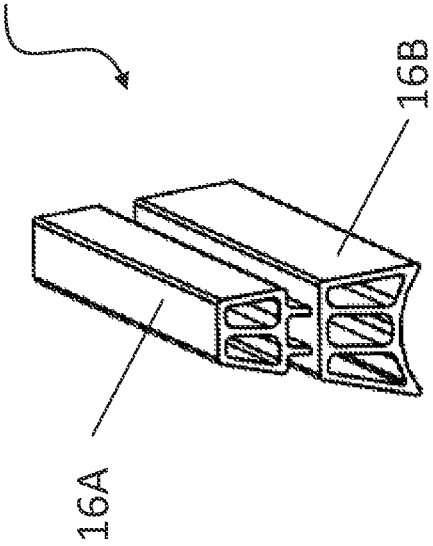
FIG. 3 a front perspective view of one embodiment of an internal bracing system for a suspension rail of a snowmobile.
Figure 5:
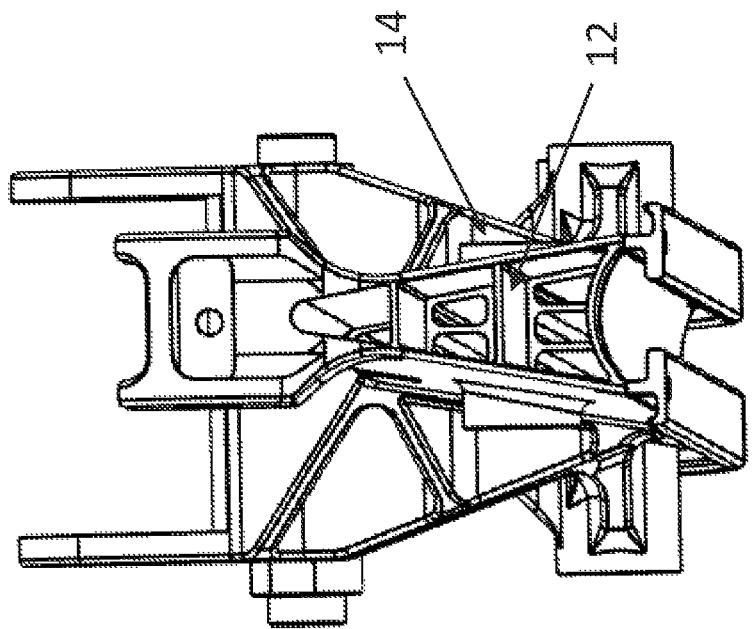
FIGS. 5 and 6 are right and left front perspective views of the internal bracing installed in the suspension rail of a snowmobile.
Figure 6:
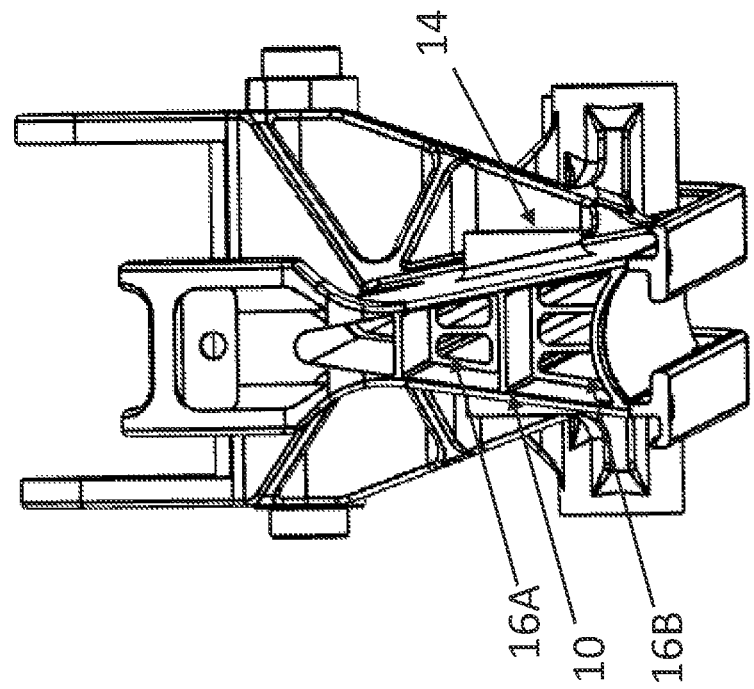
Figure 10:
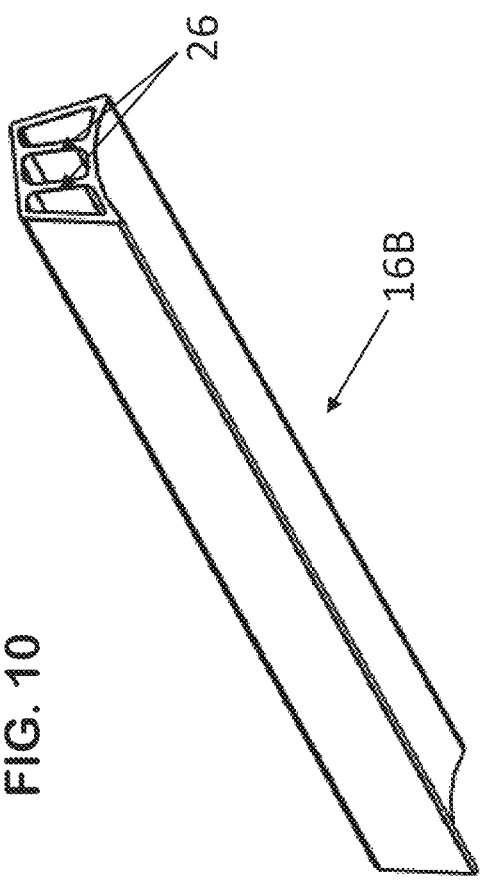
FIG. 10 is a bottom perspective view of an internal brace for the suspension rail of the snowmobile.
Figure 11:
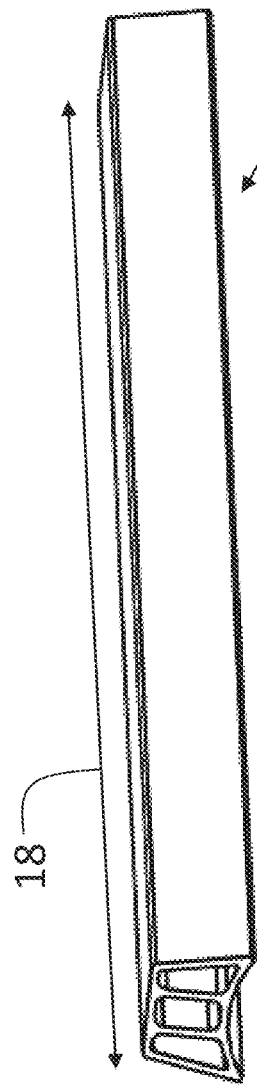
FIG. 11 is a side perspective view of the internal brace for the suspension rail of the snowmobile illustrated in FIG. 10.
Figure 12:
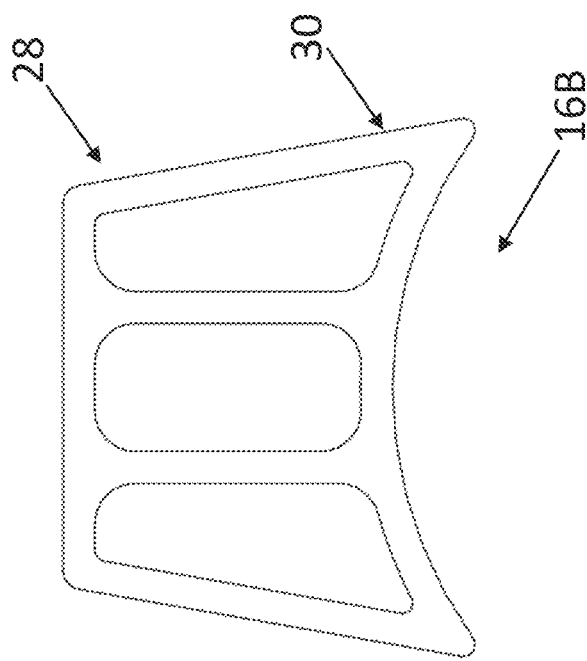
FIG. 12 is a front view of the internal brace for the suspension rail of the snowmobile illustrated in FIG. 10.

Referring back to FIGS. 1-2, the cavity 12 of the suspension rail 14 may have one or more surfaces that allow for contact with one or more surfaces of the one or more housings 16 such that the one or more housings 12 may not require a cross-sectional shape and/or outer dimensions that substantially match the cross-sectional shape and/or inner dimensions of the cavity 12.

In one or more embodiments, the one or more housings 16 may be provided in lengths ranging from about 28 inches to about 39 inches and when the two housings are utilized for bracing, the housings may have the same or different lengths. Such a system may increase the stability of the suspension rail by more than 45%, reducing the risk of breaking or snapping of the suspension rail on rough terrain.

One or both housings may be utilized for bracing the suspension rail of a snowmobile and the profile of the one or more housings having variations in shape and dimension such that one or more surfaces of the housing are in contact with one or more surfaces inside the suspension rail.

Although the present disclosure has been described with reference to preferred embodiments, workers skilled in the art will recognize that changes may be made in form and detail without departing from the spirit and scope of the disclosure.

The invention claimed is:

1. A bracing system for a suspension rail of a snowmobile, the bracing system comprising a tubular housing having a length and a cross-sectional profile providing exterior surface dimensions along the length of the tubular housing that allow the tubular length to be inserted into a cavity in the suspension rail in a manner such that when the bracing system is enclosed in the cavity of the suspension rail, the bracing system is substantially stationary with respect to vertical and lateral movement.

2. The bracing system of claim 1 and further comprising a second tubular housing having a length and a cross-section profile providing exterior surface dimensions along the length of the tubular housing that allow the tubular length to be inserted into a cavity in the suspension rail in a manner such that when the bracing system is enclosed in the cavity of the suspension rail, the bracing system is substantially stationary with respect to vertical and lateral movement and wherein the tubular housing is a first tubular housing positioned above the second tubular housing within the cavity of the suspension rail of the snowmobile.

3. The bracing system of claim 2 wherein the first tubular housing and the second tubular housing have different cross-section profiles.

4. The bracing system of claim 2 wherein the first tubular housing and the second tubular housing are not in direct contact with one another within the cavity and each of the first tubular housing and the second tubular housing are supported by or in direct contact with one or more interior surfaces of the cavity of the suspension rail.

5. The bracing system of claim 1 wherein the tubular housing comprises an internal wall extending between two opposing wall surfaces of the tubular housing.

6. The bracing system of claim 1 wherein the tubular housing comprises an external surface extending from the perimeter of the tubular housing for providing a support surface for the tubular housing within the cavity of the suspension rail, wherein the external surface extending from the perimeter of the tubular housing contacts an inner surface of the suspension rail.

7. The bracing system of claim 1 wherein the tubular housing braces the suspension rail along substantially the entire length of the suspension rail as the tubular housing is in contact with one or more interior surfaces of the suspension rail along substantially the entire length of the suspension rail.

8. The bracing system of claim 1 wherein the tubular housing is a tubular extrusion comprising aluminum and comprising a trapezoidal extrusion profile.

9. The bracing system of claim 1 wherein the tubular housing is comprised of aluminum, titanium, fiberglass or combinations thereof.

10. An internal bracing and stiffening element for a suspension rail for a snow mobile, the element comprising:

a housing configured for installation within a cavity of the suspension rail and comprising an upper surface, lower surface, and opposing side surfaces extending along a length of the housing wherein at least one of the upper surface and opposing side surfaces are configured to directly contact an inner surface of the suspension rail when the housing is installed within the interior of the suspension rail, wherein the length of the housing is equal to or less than a length of the interior of the suspension rail, wherein the housing has dimensions sufficient to allow the housing to fit within the interior of the suspension rail without lateral or vertical movement therein, and wherein the housing is secured within the interior of the suspension rail without hardware for fastening or coupling the housing to the interior of the suspension rail.

11. The internal bracing and stiffening element of claim 10 wherein each of the upper surface and opposing side surfaces has dimensions configured to abut an interior surface of the suspension rail.

12. A method for bracing a suspension rail of a snowmobile comprising inserting one or more internal bracing elements into an interior cavity of the suspension rail of the snowmobile and concealing the one or more internal bracing elements therein and wherein the one or more internal bracing elements have dimensions sufficient to fit within the interior cavity in a manner wherein vertical and lateral movement within the interior cavity is prevented.

13. The method of claim 12 wherein securing the one or more internal bracing elements within the interior cavity comprises directly contacting one or more surfaces of one or more internal bracing elements directly with one or more interior surfaces of the cavity for holding the one or more internal bracing elements in an installation position.

* * * * *